350-96.24 SR

XR 3,609,367 , 2R

United States [11] 3,609,367

[72] Inventor Donald Robert Barron
Sunbury-on-Thames, England
[21] Appl. No. 856,896
[22] Filed Sept. 4, 1969
[45] Patented Sept. 28, 1971
[73] Assignee Electric & Musical Industries Limited
Hayes, Middlesex, England
[32] Priority Sept. 4, 1968
[33] Great Britain
[31] 42,151/68

[54] STATIC SPLIT PHOTOSENSOR ARRANGEMENT HAVING MEANS FOR REDUCING THE DARK CURRENT THEREOF
5 Claims, 2 Drawing Figs.

[52] U.S. Cl. 250/83.3 H, 250/227, 350/96 B
[51] Int. Cl. G01j 3/00, G02b 5/14
[50] Field of Search 250/83.3 H, 83.3 HP, 227; 350/96 B

[56] References Cited

UNITED STATES PATENTS

| | | | |
|---|---|---|---|
| 3,058,021 | 10/1962 | Dunn | 250/227 X |
| 3,244,894 | 4/1966 | Steele et al | 250/227 |
| 3,320,420 | 5/1967 | Paglee et al | 250/83.3 H |
| 3,496,363 | 2/1970 | Rome | 250/227 X |

*Primary Examiner*—Archie R. Borchelt
*Attorney*—William W. Downing, Jr.

ABSTRACT: A static split photosensor arrangement includes a split optical system lying between an incidence plane and an emergence plane. The optical system comprises a plurality of optical fibers having diameters which taper from a relatively large diameter at the incidence plane to a relatively small diameter at said emergence plane. The fibers are so arranged that their relatively large diameter ends form a substantially continuous receiving surface for incident photon energy in said incidence plane, and their relatively small diameter ends form a plurality of groups in said emergence plane, each of said groups communicating uniquely with one of a plurality of surfaces sensitive to incident photon energy, the sensitive surfaces being arranged in a plane parallel to said emergence plane. Because of the tapering diameters of the optical fibers, the combined areas of the plurality of sensitive surfaces is less than the area of the receiving surface and therefore, while the system remains substantially continuous with regard to the reception of photon energy, the sensitive surfaces may be separated by a sufficient distance to enable the insertion of a guard ring surrounding each of the sensitive surfaces, thereby reducing the edge leakage component of dark current.

Figure 1:
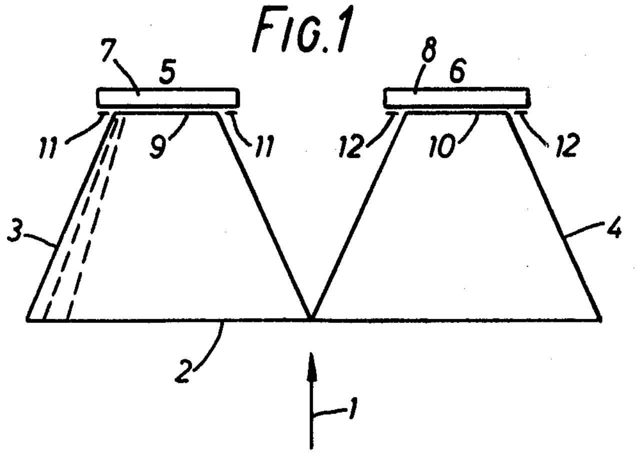

3609367
OR IN 250/349

STATIC SPLIT PHOTOSENSOR ARRANGEMENT HAVING MEANS FOR REDUCING THE DARK CURRENT THEREOF

This invention relates to static split photosensor and to reducing the dark current of such sensors.

An infrared sensor may take the form of a surface barrier cell, such a cell being formed, for example, by a substrate of silicon having disposed on its surface a thin layer of antimony. This layer, in operation of the cell, is biassed positively with respect to the substrate and collects charges, released in the substrate by photoemission as a result of infrared energy incident on the surface layer and passing through this layer into the substrate. In the absence of incident energy it is found that a residual current leaks to and is collected by the surface layer. This current is objectionable since random fluctuations in its intensity reduce the noise performance of the system of which the cell is a part. The residual leakage is known as dark current.

The usual method of reducing the dark current in a cell such as that described is by a guard ring of the surface layer material disposed around and in close proximity to the surface layer of the cell. Such a ring reduces the component of the dark current leakage which is associated particularly with the edge of the cell surface layer and which makes the major contribution to the total dark current of the cell. The component of dark current leakage associated with the bulk of the substrate is not sensibly affected by the utilization of the guard ring.

In a static split sensor, as used for instance in tracking an infrared beacon carried by a missile which requires to be guided by means of the derived tracking information, the surface layer of a surface barrier cell is split into quadrant regions separated from one another by a gap of very small dimensions. It is found that although the quadrant regions exercise some mutual guarding effect to reduce the edge component of dark current leakage along the gap edges, this effect is not large.

One object of the invention is to provide a static split photosensor arrangement in which the edge leakage component of the dark current is more fully suppressed.

Another object of the invention is to provide a static split photosensor arrangement in which the said one object is achieved and in which the bulk leakage component of the dark current is also reduced.

Another object of the invention is to provide a static split photosensor arrangement including:

A. a plurality of photosensitive surfaces, b. a split optical system, comprising a plurality of portions communicating between an incidence plane and an emergence plane, c. the portions of said optical system lying in said incidence plane being adapted to present a substantially continuous receiving surface to incident photon energy:

d. each portion of said optical system lying in said emergency plane being adapted to communicate uniquely with one of said photosensitive surfaces, e. a guard ring, of guard material, surrounding the perimeter of each of said photosensitive surfaces, and f. the optical system being such that the combined area of said photosensitive surfaces is sufficiently less than that of the said substantially continuous receiving surface to provide spaces between adjacent ones of said photosensitive surfaces of sufficient size to accommodate the guard material.

In one manner of carrying out said invention the optical system takes in part at least the form of a split fiber optical system. If four infrared sensitive cells are employed in said arrangement then the optical fibers are split into four groups, each group communicating uniquely with each cell. Preferably the fibers of said groups are tapered so that the same or nearly the same amount of incident energy is concentrated into a smaller area than if such tapering is not employed, and consequently cells of substantially reduced size can be employed, and there is also provided increased space between the said cells for the insertion of guard rings or the like, whilst retaining substantial continuity with regard to the reception of incident photon energy. With such cells the bulk leakage component of dark current is materially reduced. Instead however of employing a split fiber optical system, a split lens or other split optical system may be employed.

Figure 2:
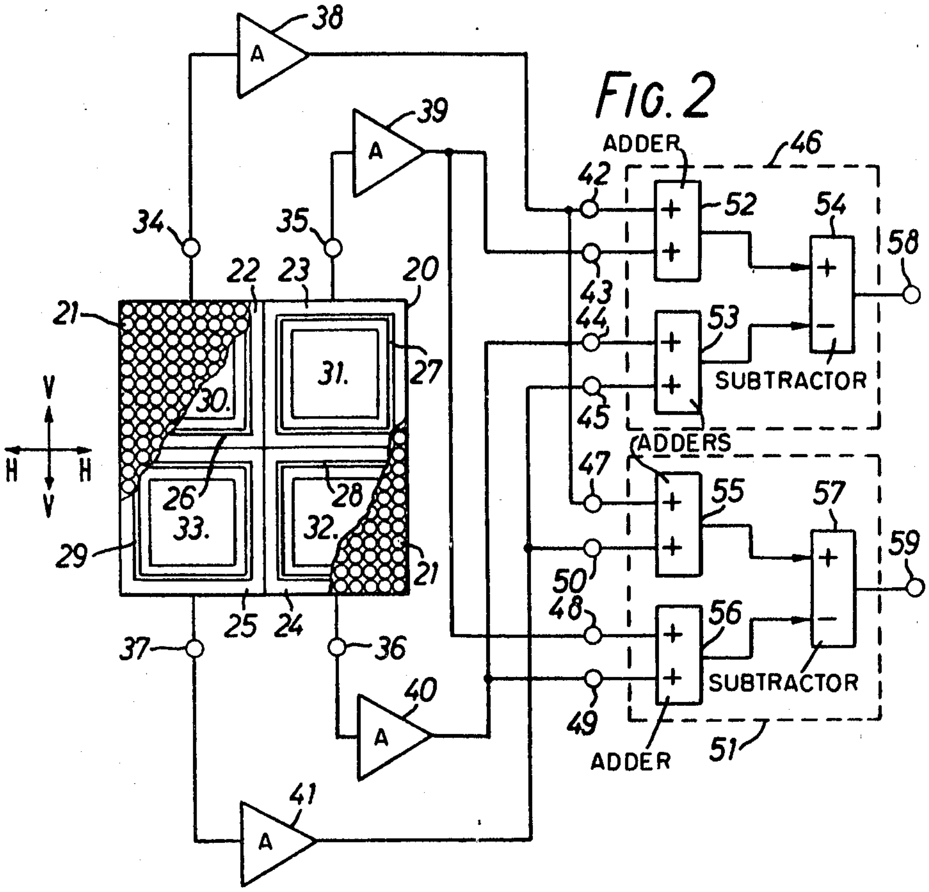

The invention will now be described by way of example with reference to the accompanying drawings in which:

FIG. 1 illustrates in side elevation a quadrant-type static split sensor arrangement in which the optical splitting is achieved by fiber optical grouping, and FIG. 2 shows, in face elevation and partly in cross section a static split photosensor arrangement coupled to circuits for deriving therefrom error signals to be used in guiding a vehicle along a selected course.

In FIG. 1 the arrow 1 indicates the incidence of infrared energy upon the arrangement, this energy falling upon the optical face 2 formed by the ends of the optical fibers of the fiber optical system lying in the plane of this face. Said fibers are tapered to a reduced diameter at their ends remote from the face 2 and are split into four groups corresponding to four square juxtaposed quadrant areas constituting the face 2. The groups taper back from the face 2 towards infrared sensitive cells to communicate the incident infrared energy to the sensitive faces of the cells, and in the side elevation of the drawing two of the groups are apparent as the groups 3 and 4 communicating with the respective cells 5 and 6. Said cells comprise substrates 7 and 8 on which are formed barrier layers 9 and 10, and the tapered groups 3 and 4 of optical fibers are arranged so that the fiber ends remote from the surface 2 are closely adjacent said barrier layers to communicate said incident energy thereto. To reduce the edge leakage component of dark current of said layers 9 and 10 these layers are provided with guard surfaces 11 and 12 respectively round their perimeters which preferably completely enclose the layers.

A static split photosensor arrangement may be used, for example, for tracking an infrared beacon carried by a missile. If four photosensitive cells are used, such as described in relation to FIG. 1, the output signals from said cells may be processed and used to correct deviation from the desired course of such a missile, in both vertical and horizontal angular directions.

Referring now to FIG. 2, a static split photosensor is shown at 20, in face elevation, partly in cross-section. The ends of some of the optical fibers which receive incident photon energy are shown schematically in the two portions 21. The said fibers are in the present example divided into four groups, shown as 22, 23, 24 and 25. Each of the said groups of fibers communicates uniquely with a photosensitive cell, 30, 31, 32 and 33 respectively, and each of said cells has an associated guard ring 26, 27, 28 and 29 respectively. The cells 30–33 are smaller in area than the outer ends of the receiving groups of fibers 22–25 because the said fibers taper towards the said cells, thus providing simultaneously a reduction in the bulk leakage component of dark current and sufficient space between said cells for the inclusion of a peripheral guard ring around each of said cells. The output electrical signal from cells 30, 31, 32 and 33 appear respectively at terminals 34, 35, 36 and 37, and the said signals are amplified in gain-controlled amplifiers 38, 39, 40 and 41 respectively, whence they are applied to the input terminals 42, 43, 44 and 45 respectively of the vertical error signal computing circuits 46. The two arrows VV and HH indicate the vertical and horizontal directions in the present example. The vertical error signals is obtained by subtracting the sum of the output signals from cells 32 and 33 from the sum of the output signals from cells 30 and 31 and therefore the signals applied to terminals 42 and 43 are summed in adding circuit 52 and the signals applied to terminals 44 and 45 are summed in adding circuit 53. The output of circuits 52 and 53 are applied to the two input terminals of a subtracting circuit 54 and the signal appearing at output terminal 58 is therefore the vertical error signal.

The signals appearing at the outputs of the said amplifiers 38, 39, 40 and 41 are also applied to the input terminals 47, 48, 49 and 50 of the horizontal error computing circuits 51. The horizontal error is obtained by subtracting the sum of the output signals from cells 31 and 32 from the sum of the output signals from cells 30 and 33 and therefore in circuits 51, the signals applied to terminals 47 and 50 are applied to adding circuit 55, and the signals applied to terminals 48 and 49 are applied to adding circuit 56. The output signals from circuits 55 and 56 are then applied to the two input terminals of subtracting circuit 57, the signal appearing at terminal 59 therefore being the horizontal error signal.

The signals from terminals 58 and 59 are communicated to the missile in order to correct for deviations of said missile from its desired course. The communication may, for example, take the form of a pulse-coded radio link.

The adding circuits 52, 53, 55 and 56 may, for example comprise resistive networks and the difference circuits 58 and 59 may comprise, for example a common cathode difference amplifier or its transistorized equivalent.

It will be understood that although in the application of the invention as normally envisaged the incident energy would lie in that part of the spectrum beyond the visible red normally known as the infrared portion of the spectrum, the invention is also applicable to devices suitable for incident energy which falls for example in the visible region.

It will be appreciated that in place of cells of the surface barrier type there may be used planar diffused junction silicon detectors to provide said photosensitive surfaces.

What I claim is:

1. A static split photosensor arrangement including:

a. a plurality of photosensitive surfaces, b. a split optical system, comprising a plurality of portions communicating between an incidence plane and an emergence plane, c. the portions of said optical system lying in said incidence plane being adapted to present a substantially continuous receiving surface to incident photon energy, d. each portion of said optical system lying in said emergence plane being adapted to communicate uniquely with one of said photosensitive surfaces, e. a guard ring, of guard material, surrounding the perimeter of each of said photosensitive surfaces, and f. the optical system being such that the combined area of said photosensitive surfaces is sufficiently less than that of the said substantially continuous receiving surface to provide spaces between adjacent ones of said photosensitive surfaces of sufficient size to accommodate the guard material.

2. A static split photo sensor arrangement according to claim 1 wherein the said photosensitive surfaces are the sensitive surfaces of cells of the surface barrier type.

3. A static split photosensor arrangement according to claim 1 wherein the said photosensitive surfaces comprise planar diffused junction silicon detectors.

4. A static split photosensor arrangement including a split optical system lying between an incidence plane and an emergence plane, said optical system comprising a plurality of optical fibers, substantially all of said fibers having diameters which reduce from a relatively large diameter at said incidence plane to a relatively small diameter at said emergence plane said fibers being so arranged that their relatively large diameter ends form a substantially continuous receiving surface for incident photon energy in said incidence plane and their relatively small diameter ends form a plurality of groups in said emergence plane, each of said groups communicating uniquely with one of a plurality of surfaces sensitive to incident photon energy, the said sensitive surfaces being arranged in a plane substantially parallel to said emergence plane, the total area of said plurality of sensitive surfaces being less than the area of said plurality of sensitive surfaces being less than the area of said receiving surface because of the tapering diameters of said optical fibers, and a guard ring surrounding each of said sensitive surfaces.

5. A static split photosensor arrangement according to claim 4, including amplifying means for amplifying signals derived from each of said sensitive surfaces in response to incident photon energy and means for deriving error signals from the amplified signals, said error signals relating to the deviation of the source of said energy from a desired course.